US007095827B2

(12) United States Patent
Guedalia

(10) Patent No.: US 7,095,827 B2
(45) Date of Patent: Aug. 22, 2006

(54) BROADCASTING AND CONFERENCING IN A DISTRIBUTED ENVIRONMENT

(75) Inventor: David Guedalia, Beit Shemesh (IL)

(73) Assignee: NMS Communications Corporation, Framingham, MA (US)

( * ) Notice: Subject to any disclaimer, the term of this patent is extended or adjusted under 35 U.S.C. 154(b) by 424 days.

(21) Appl. No.: 10/215,922

(22) Filed: Aug. 9, 2002

(65) Prior Publication Data

US 2003/0035516 A1 Feb. 20, 2003

Related U.S. Application Data

(60) Provisional application No. 60/313,700, filed on Aug. 20, 2001.

(51) Int. Cl.
*H04M 1/64* (2006.01)
*G06F 15/16* (2006.01)

(52) U.S. Cl. ................................ 379/88.17; 379/88.16; 709/217

(58) Field of Classification Search ............... 379/67.1, 379/88.13, 88.14, 88.17, 88.22, 90.01, 93.01; 709/206, 217–219
See application file for complete search history.

(56) References Cited

U.S. PATENT DOCUMENTS

| | | | | |
|---|---|---|---|---|
| 6,161,137 | A | 12/2000 | Ogdon et al. | 709/224 |
| 2002/0057678 | A1* | 5/2002 | Jiang et al. | 370/353 |
| 2003/0023440 | A1* | 1/2003 | Chu | 704/249 |

OTHER PUBLICATIONS

U.S. Appl. No. 09/798,377, entitled: "Telephone and wireless access to computer network-based audio reference to related application", filed Mar. 2, 2001.

U.S. Appl. No. 60/313,700, entitled "Broadcasting and Conferencing in a Distributed Environment", filed Aug. 20, 2001.

* cited by examiner

*Primary Examiner*—Ovidio Escalante
(74) *Attorney, Agent, or Firm*—Chapin IP Law, LLC; Barry W. Chapin, Esq.

(57) ABSTRACT

An IVR operative for voice communication with a telephone network and a data network and including a VoiceXML interpreter The VoiceXML interpreter being operative to provide a streaming audio output to the data network.

9 Claims, 5 Drawing Sheets

BROADCASTING AND CONFERENCING IN A DISTRIBUTED ENVIRONMENT

REFERENCE TO RELATED APPLICATION

This application claims priority from U.S. Provisional Patent Application No. 60/313,700, entitled "BROADCASTING AND CONFERENCING IN A DISTRIBUTED ENVIRONMENT" filed Aug. 20, 2001

FIELD OF THE INVENTION

The present invention relates to a system and method for telephony conferencing and broadcasting

BACKGROUND OF THE INVENTION

Telephones offer an effective means of enabling not only two-way conversations among individuals and groups of individuals, but also one-way broadcasts from a single host to many participants In a typical two-way conversation, two individuals may utilize a telephone network for a two-way conversation. The first individual may directly communicate voice over the telephone network to a second individual and vice versa A more sophisticated method of two-way conversation is the telephone conference In a telephone conference, groups of individuals may coordinate a conferencing session in which bi-directional conversation is enabled through the use of mixing technologies Each of the members of the group typically connects to a central mixing, service that transmits the conversation to each member Telephone conferences enhance the ability of groups of individuals to communicate with each other.

A third popular utilization of the telephone is telephone broadcasts. As opposed to bi-directional two-way communication, telephone broadcasts provide a mechanism for a single host to communicate to multiple participants. Telephone broadcastilne, is particularly useful for distance learning, where students who cannot physically attend a lecture can hear the lecture broadcast over the telephone Ogdon et al in U.S. Pat. No. 6,161,137 entitled "Method and system for providing a presentation on a network", describe a method of telephone and video broadcasting in which interactive and/or real-time presentations may be broadcast to multiple participants Each participant may have access to a data communication network eg the Internet, and/or a telephony network for voice communication In Ogdon et al the participants access a broadcast that originates from content servers, such as steaming web servers Recently, with the advent of the Internet, another method for enabling multiple participants to converse has emerged Internet conference calls have become an increasinly popular and effective means of communication There are many conference call services available through the Internet and telephone, such as Spiderphone.com, Inc Spiderphone's system provides advanced conferencing features, such as the ability to view a list of who is participating in the conference through a web browser and to send web pages, PowerPoint files or any other suitable types of file to conference participants.

One of the challenges facing developers of telephony applications is to determine a suitable application environment. VoiceXML has recently emerged as a standard in the field. VoiceXML is a markup language which enables VoiceXML web server platform developers to make information accessible to telephone users in the same manner that regular web servers provide information to web users

SUMMARY OF THE INVENTION

The present invention seeks to provide an improved system and methodology for broadcasting of audio content via a telephone.

There is thus provided in accordance with a preferred embodiment of the present invention an IVR operative for voice communication with a telephone network and a data network The VoiceXML interpreter and the VoiceXML interpreter provide a streaming audio output to the data network Further in accordance with a preferred embodiment of the present invention, the VoiceXML interpreter includes an object module, which receives digitized voice from buffers in the IVR and provides the streaming audio output There is also provided in accordance with a preferred embodiment of the present invention a system for broadcasting of audio content via a telephone, including a broadcasting subsystem and a broadcast IVR operative for voice communication with a telephone and including a VoiceXML interpreter providing a streaming audio output to the broadcasting subsystem Further in accordance with a preferred embodiment of the present invention, the VoiceXML interpreter includes an object module, which receives digitized voice from buffers in the broadcast IVR and provides the streaming audio output to the broadcasting subsystem Still further in accordance with a preferred embodiment of the present invention, the broadcasting subsystem includes at least one encoder receiving the streaming audio output.

Preferably, the broadcasting subsystem includes at least one of a cache and a multicaster receiving an output from the at least one encoder.

Additionally in accordance with a preferred embodiment of the present invention, the broadcasting subsystem includes at least one reception IVR operating to receive the streaming audio output via the encoder and via the cache and the multicaster Still further in accordance with a preferred embodiment of the present invention, the broadcasting subsystem includes a VoiceXML interpreter operating to receive the streaming audio output from the broadcasting subsystem

BRIEF DESCRIPTION OF THE DRAWINGS

The present invention will be more fully understood and appreciated from the following detailed description, taken in conjunction with the following drawings and appendices in which.

DETAILED DESCRIPTION OF THE PRESENT INVENTION

Figure 1:
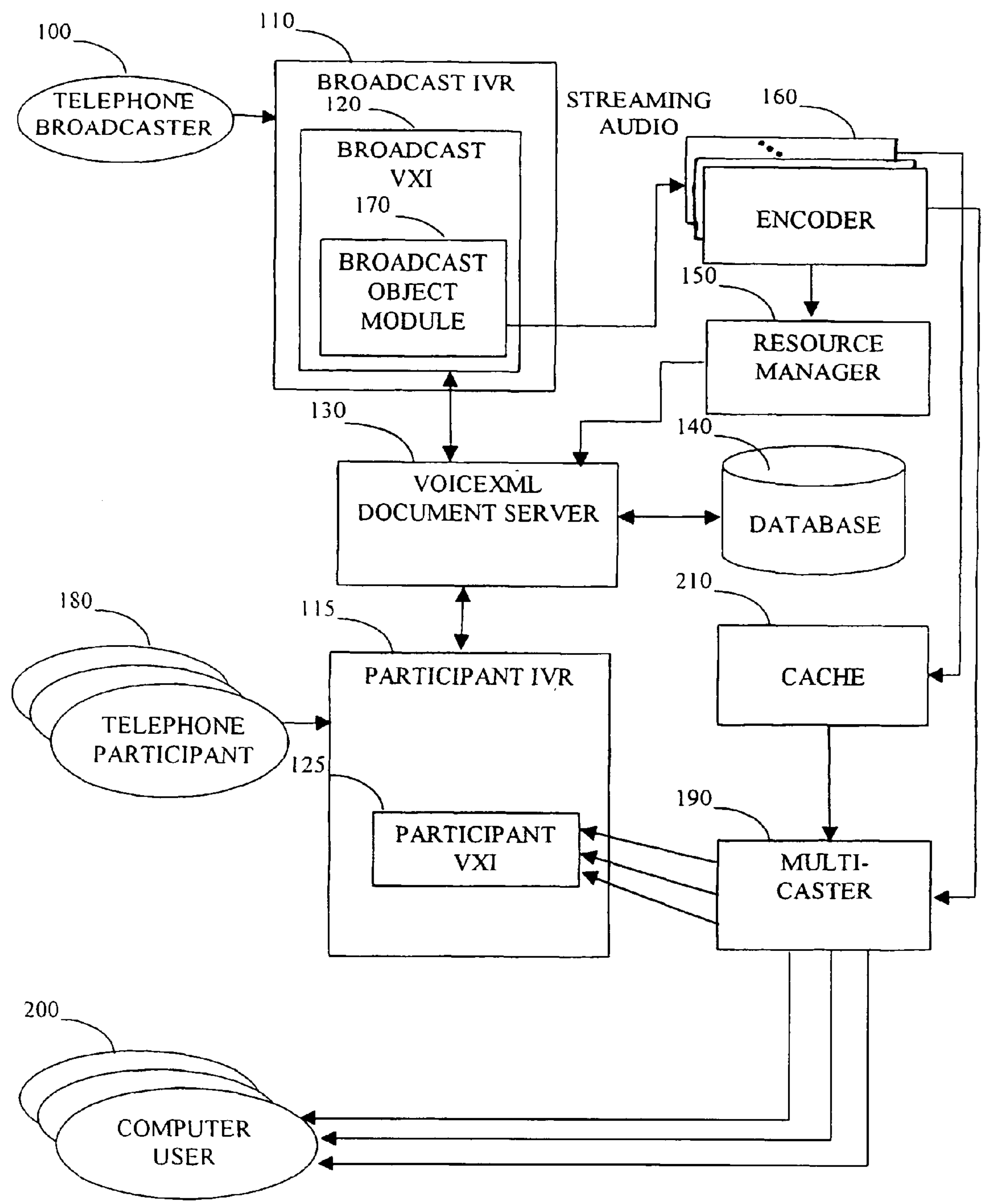
FIG. 1 is a simplified block diagram illustration of a system and method for Telephone Broadcasts within a VoiceXML environment, constructed and operative in accordance with a preferred embodiment of the present invention.

The present invention provides a system and methodology for enhanced telephone conferenicng, and broadcasting in a distributed environment In a typical scenario in accordance with the present invention, a university lecturer may wish to broadcast a lecture to a group of university students The lecturer places a telephone call to the system of the present invention and is typically prompted to provide the name of the lecture The lecturer supplies the name of the lecture, e.g., 'Microbial Evolution', which is then stored in the system database.

A university student wishing to hear the lecture entitled 'Microbial Evolution', places a telephone call to the system of the present invention and is typically prompted to choose the name of a lecture from a list of titles. The student then selects the appropriate lecture, in this scenario 'Microbial Evolution', and hears the lecture broadcast over the telephone In a similar scenario, a group of university students participating in a telecourse may wish to hold a teleconference to discuss a course assignment. A student who wishes to participate in the discussion typically places a telephone call to the system of the present invention The student is typically prompted to provide the title of desired conference Upon providing the conference title, the student is connected to the discussion session In this manner, multiple students may join the discussion session Reference is now made to FIG. 1, which is a simplified block diagram illustration of telephone broadcasting within a VoiceXML environment and to FIGS. 2A and 2B which are simplified flow charts, illustrating the operation of the system of FIG. 1 in accordance with a preferred embodiment of the present invention, In the example shown, a telephone broadcaster 100 who wishes to transmit a broadcast via the system of the present invention, places a telephone call to a Broadcast IVR 110 A Broadcast VoiceXML Interpreter (VXI) 120, contained within the Broadcast IVR 110, connects to a VoiceXML document server 130. VoiceXML document server 130 provides to the Broadcast VXI 120 an application necessary to effect the broadcast This application may include various application documents For example, the application documents supplied by the VoiceXML document server 130 may cause the Broadcast VXI 120 to send the following query to the telephone broadcaster 100 "What is the name of your broadcast?"

The Broadcast VXI 120 may contain a fetcher to retrieve documents from VoiceXML document server 130, a compiler to compile retrieved documents and a cache to store compiled documents In response to the query, the telephone broadcaster 100 may provide the Broadcast VXI 120 with the name of the broadcast, for instance 'Microbial Evolution'. The broadcast name is provided to the VoiceXML document server 130 by the Broadcast VXI 120 The VoiceXML document server 130 associates the broadcast name with a relevant URL in a Database 140 Next, the VoiceXML document server 130 queries a Resource Manager 150 to identify an appropriate Encoder 160, eg, WAV-to-MP3 for the broadcast. The VoiceXML document server 130 then generates a VoiceXML document containing an object tag, as described hereinbelow, which refers to the appropriate Encoder 160 and specifies a Broadcast Object Module 170.

The Broadcast VXI 120 receives the VoiceXML document and loads the Broadcast Object Module 170. The Broadcast Object Module 170 connects to the appropriate Encoder 160 and initiates a loop that begins to transmit streaming audio from the Broadcast Object Module 170 to the Encoder 160 In one embodiment, the Encoder 160 subsequently makes the encoded data available to other telephone participants through a Multicaster 190 In one embodiment of the present invention, the data may be encoded to MP3 by the Encoder 160 Additionally or alternatively, the encoded data is stored in a Cache 210 The Multicaster 190 may also retrieve data from the Cache 210

A telephone participant 180 who wants to hear the 'Microbial Evolution' broadcast, places a telephone call to a Participant IVR 115. The Participant VXI 125, contained within the Participant IVR 115, connects to the VoiceXML document server 130 and queries the Database 140 for a list of available broadcast names.

In one embodiment of the present invention, the VoiceXML document server 130 generates a grammar based on a list of available broadcast names. Grammars enable developers to describe the words and phrases that can be recognized by a speech recognition engine The telephone participant 180 chooses an appropriate broadcast name from the list for example 'Microbial Evolution'. The Participant VXI 125 employs the URL associated with the broadcast name to retrieve audio information from the Encoder 160.

In one embodiment of the present invention, the Participant VoiceXML Interpreter 125 may retrieve audio information from the Encoder 160 through the Multicaster 190

In another embodiment of the present invention, the Participant VXI 125 may employ the Multicaster 190 to retrieve audio information through the Cache 210 The Cache 210 may enable advanced functionality, such as 'seek, 'pause', 'rewind' and 'fast forward' Navigational capabilities of a suitable cache can be found in a U.S. patent application Ser. No. 09/798,377, entitled "Telephone and Wireless Access to Computer Network-Based Audio", the description of which is hereby incorporated by reference.

In an alternative embodiment of the present invention, a computer user 200 wishing, to receive the broadcast may connect through the Multicaster 190

On retrieving the appropriate audio information, the telephone participant commences to hear the broadcast.

Figure 3:
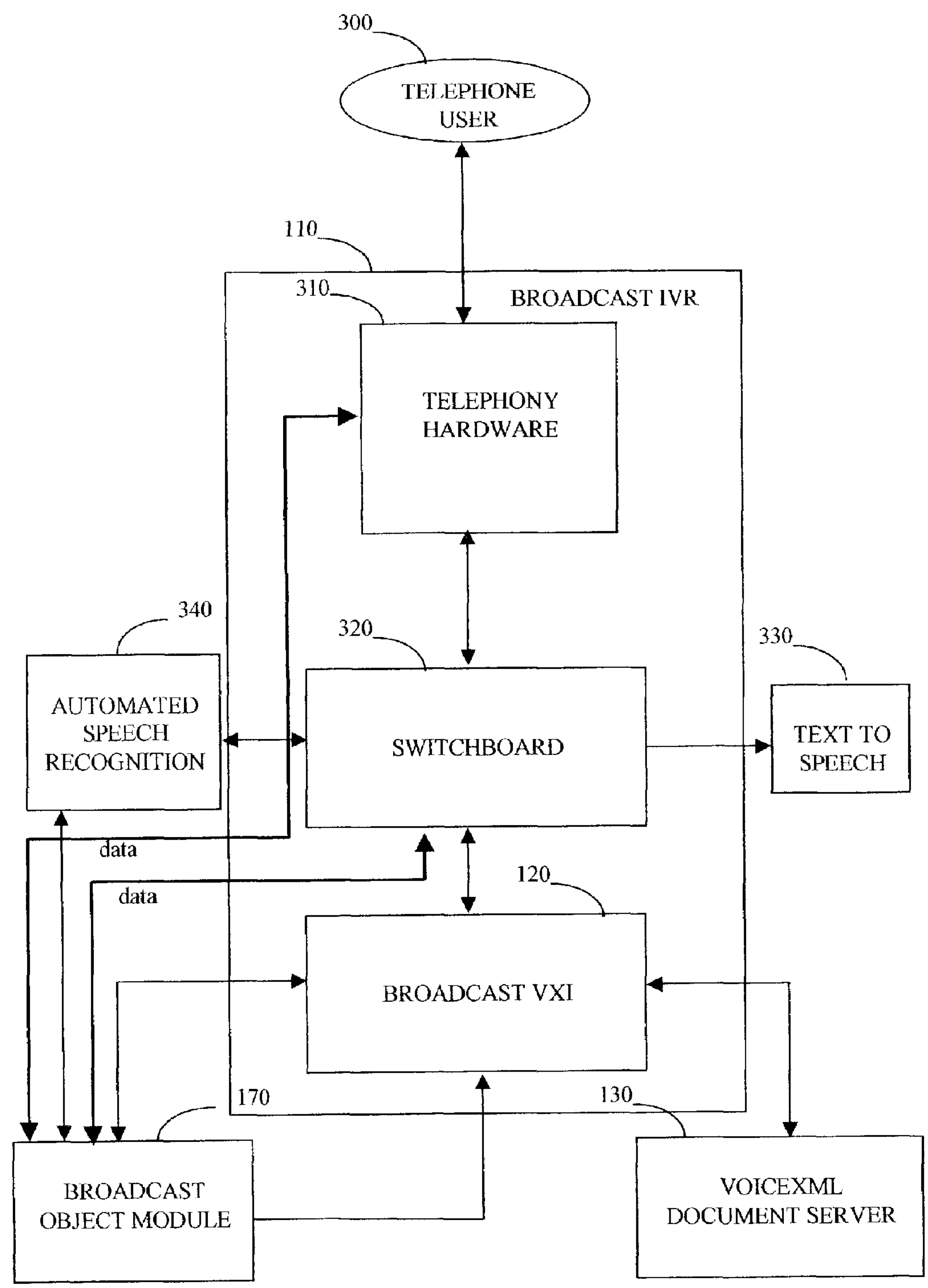
FIG. 3 is a simplified block diagram illustrating the implementation of object tag extensions in accordance with a preferred embodiment of the present invention.

Reference is now made to FIG. 3, which is a simplified block diagram illustrating a preferred implementation of an object tag module In one embodiment of the present invention, an object tag is used to enable a streaming audio output. For example, a user 300, who wishes to transmit audio, places a call to the Broadcast IVR 110 Telephony hardware 310, located within the Broadcast IVR 110 detects the telephone call and notifies a Switchboard 320. The Switchboard 320, which is connected to a Text-To-Speech device 330 and an Automated Speech Recognition device 340, instructs the telephony hardware 310 to answer the call. After the telephony hardware 310 answers the call, the Switchboard 320 queries the Broadcast VXI 120 for further instructions The Broadcast VXI 120 fetches a suitable broadcast application from the VoiceXML Document Server 130, which also specifies a destination IP address of a suitable encoder Having received a destination IP address for broadcasting streaming audio content from the user 300 to a suitable encoder, the Broadcast VXI 120 executes code residing in the Broadcast Object Module 170, whose code instructs the transmission of the streaming audio. In one embodiment of the present invention, the Broadcast Object Module 170 is embodied in a Dynamic Link Library (DLL) The Broadcast VXI 120 loads the DLL which is typically loaded to memory In another embodiment of the present invention the Broadcast Object Module 170 is embodied in a UNIX® shared object library The library may be a dynamically loadable library or a static library.

The Broadcast VXI 120 invokes an 'execute' function in the Broadcast Object Module 170 and communicates parameters, such as the destination IP address of the encoder, to the Telephony Hardware 310 The Broadcast VXI 120 also communicates the access point to the Telephony Hardware 310, which enables the loaded library to directly access the Telephony Hardware 310. For instance, direct access to the Telephony Hardware 310 could enable the loaded library to directly access recorded buffers of audio data.

Figure 2A:
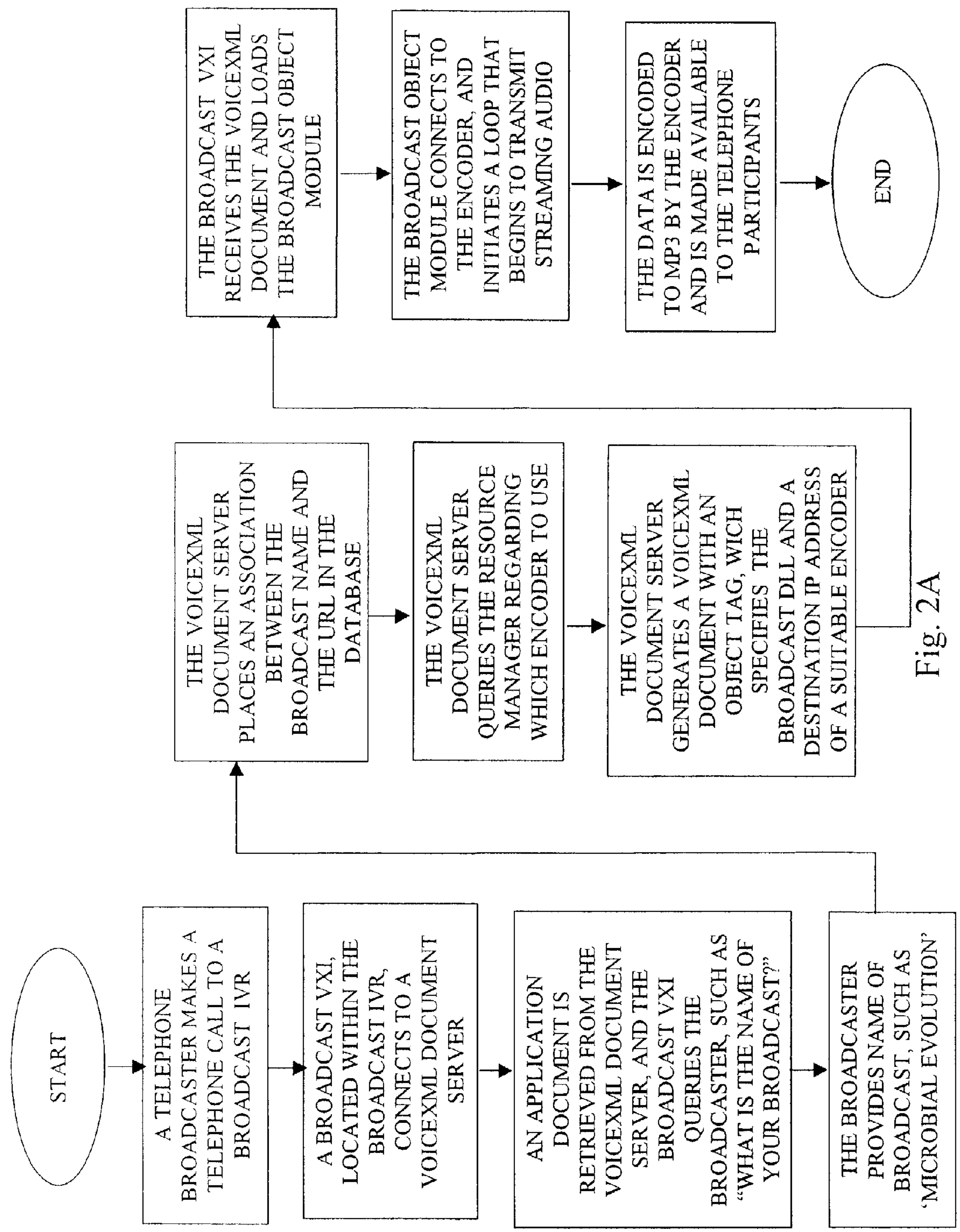
FIGS. 2A and 2B are simplified flow charts, illustrating the operation of the system of FIG. 1 in accordance with a preferred embodiment of the present invention.
Figure 2B:
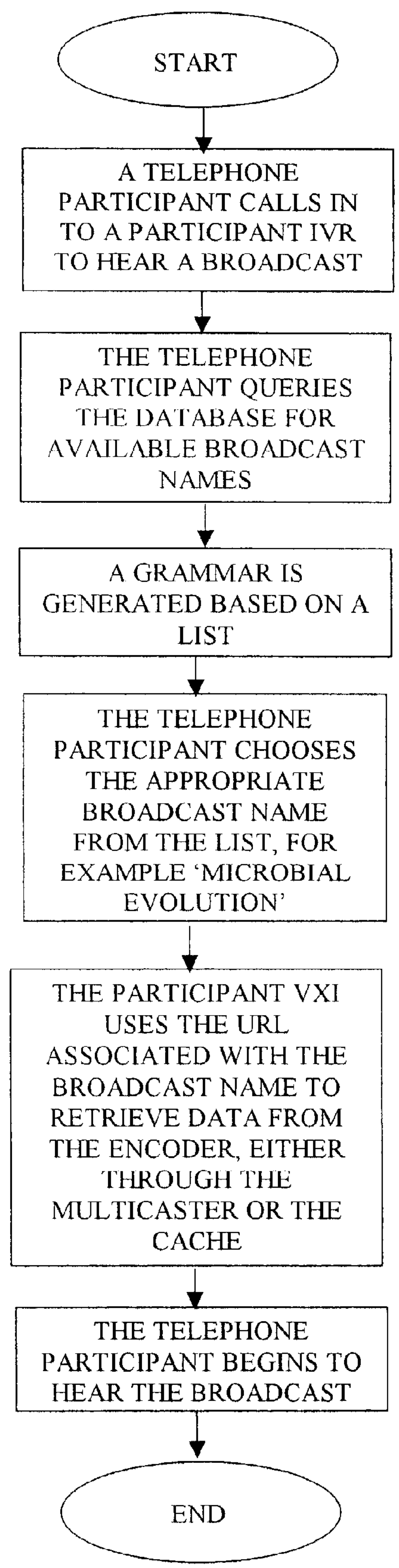
Figure 4:
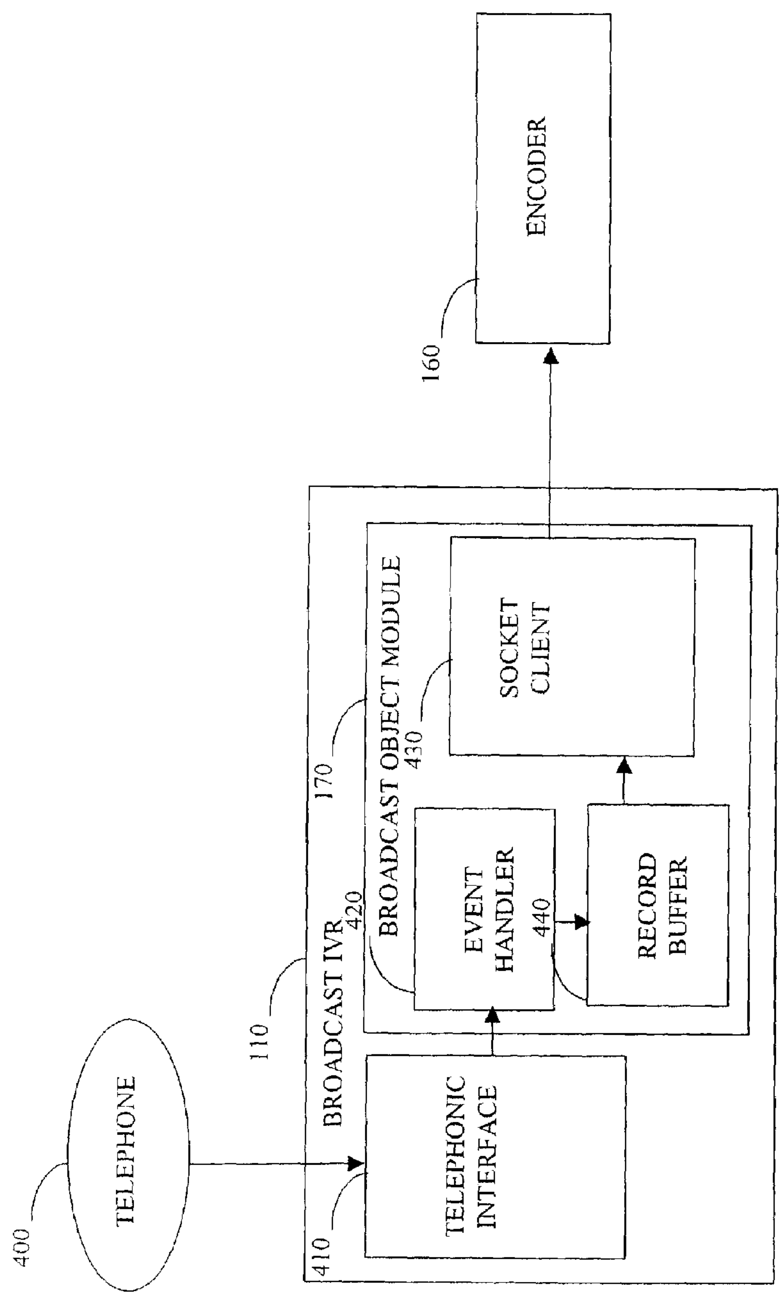
FIG. 4 is a simplified block diagram illustrating the relationship between the Socket Client, Telephonic Interface and the Encoder

Reference is now made to FIG. 4, which is a simplified block diagram illustrating the relationship between a Socket Client 430, a Telephonic Interface 410 and the Encoder 160 in the embodiment of FIGS. 1–3

A Telephone Broadcaster 400 places a telephone call to the system of the present invention and the call is received by a Telephonic Interface 410, contained within the Broadcast IVR 110 The Broadcast IVR 110 activates the Broadcast Object Module 170 as described hereinabove The Broadcast Object Module 170 is employed to enable broadcast of audio from the Telephonic Interface 410 to the Encoder 160 The Broadcast Object Module 170 contains an Event Handler 420 operative to receive events from the Telephonic Interlace 410, a Socket Client 430 designed to communicate with the Encoder 160 and a Record Buffer 440 operative to store audio data The Event Handler 420 is registered to receive telephony events from the Telephonic Interface 410 In particular, the Telephonic Interface 410 is registered to receive telephony events associated with recorded audio, especially a "buffer full" event Upon receiving a "buffer full" event, the Event Handler 420 copies a recorded buffer (not shown) retrieved from the Telephonic Interface 410 to the Record Buffer 440.

Independently, the Socket Client 430 analyses the Record Buffer 440 and continuously transmits audio data in a streaming fashion to encoder 160. The Socket Client 430 monitors and transmits data to the Encoder 160 through a suitable communication channel, such as a socket, thus affecting a constant outbound stream of audio data It will be appreciated by persons skilled in the art that the present invention is not limited by what has been particularly shown and described hereinabove. Rather the present invention includes combinations and sub-combinations of the various features described hereinabove as well as modifications and extensions thereof, which would occur to a person skilled in the art and which do not fall within the prior art.

The invention claimed is:

1. A system for broadcasting of audio content via a telephone comprising:

- a broadcasting subsystem comprising:
  - at least one encoder;
  - at least one of a cache and a multicaster receiving an output from said at least one encoder;
  - at least one reception IVR operative to receive said output via said at least one encoder and via said at least one of a cache and a multicaster; and
  - a VoiceXML interpreter operative to receive said output from said broadcasting subsystem;
- a broadcast IVR operative for voice communication with a telephone and including a VoiceXML interpreter comprising an object module which receives digitized voice from buffers in said IVR and uses said digitized voice to determine a particular audio broadcast, said Voice XML interpreter operative to provide said particular audio broadcast as a streaming audio output to said broadcasting subsystem;
- a VoiceXML document server in communication with said VoiceXML interpreter;
- a resource manager in communication with said VoiceXML document server and said at least one encoder; and
- a database in communication with said VoiceXML document server, and wherein said multicaster is in communication with at least one computer and provides said streaming audio output from said broadcasting subsystem.

2. The system of claim 1 wherein said multicaster provides said output to at least one computer user.

3. The system of claim 1 wherein said reception IVR is further operative to communicate with at least one telephone participant.

4. A system for broadcasting of audio content via a telephone comprising:

- a broadcasting subsystem comprising at least one encoder receiving streaming audio output;
- a broadcast IVR operative for voice communication with a telephone and including a VoiceXML interpreter comprising an object module which receives digitized voice from buffers in said IVR and uses said digitized voice to determine a particular audio broadcast, said Voice XML interpreter operative to provide said particular audio broadcast as the streaming audio output to said broadcasting subsystem;
- a VoiceXML document server in communication with said VoiceXML interpreter; and
- a resource manager in communication with said VoiceXML document server and said at least one encoder.

5. A system according to claim 4 and wherein said broadcasting subsystem comprises at least one of a cache and a multicaster receiving an output from said at least one encoder.

6. A system according to claim 4 and wherein said broadcasting subsystem comprises at least one reception IVR operative to receive said streaming audio output via said at least one encoder and via said at least one of a cache and a multicaster.

7. A system according to claim 6 and wherein said broadcasting subsystem includes a VoiceXML interpreter operative to receive said streaming audio output from said broadcasting subsystem.

8. The system of claim 6 wherein said multicaster is in communication with at least one computer and provides said streaming audio output from said broadcasting subsystem.

9. The system of claim 4 further comprising a database in communication with said VoiceXML document server.

* * * * *